(12) United States Patent
Mannherz et al.

(10) Patent No.: US 10,351,113 B2
(45) Date of Patent: Jul. 16, 2019

(54) METHOD FOR OPERATING AN AUTOMATED PARKING BRAKE

(71) Applicant: Robert Bosch GmbH, Stuttgart (DE)

(72) Inventors: Edith Mannherz, Weinsberg (DE); Helmut Wolff, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/656,908

(22) Filed: Jul. 21, 2017

(65) Prior Publication Data

US 2018/0029574 A1 Feb. 1, 2018

(30) Foreign Application Priority Data

Jul. 26, 2016 (DE) .................. 10 2016 213 645

(51) Int. Cl.
| | | |
|---|---|---|
| *B60T 8/17* | (2006.01) | |
| *B60T 8/24* | (2006.01) | |
| *B60T 7/12* | (2006.01) | |
| *B60T 8/172* | (2006.01) | |
| *B60T 13/66* | (2006.01) | |
| *B60T 13/68* | (2006.01) | |
| *B60T 13/74* | (2006.01) | |

(52) U.S. Cl.
CPC .............. *B60T 8/245* (2013.01); *B60T 7/12* (2013.01); *B60T 8/172* (2013.01); *B60T 13/662* (2013.01); *B60T 13/686* (2013.01); *B60T 13/741* (2013.01); *B60T 13/746* (2013.01); *B60T 7/122* (2013.01); *B60T 2201/06* (2013.01)

(58) Field of Classification Search
CPC ........ B60T 8/172; B60T 8/245; B60T 11/105; B60T 13/66; B60T 13/74; B60T 13/588; B60T 13/662; B60T 13/745; B60T 17/221
USPC .............................. 188/156–164; 701/70–782
See application file for complete search history.

(56) References Cited

U.S. PATENT DOCUMENTS

| | | | |
|---|---|---|---|
| 2011/0042171 A1* | 2/2011 | Knechtges ................ | B60T 8/32 188/106 F |
| 2011/0272225 A1* | 11/2011 | Febrer ...................... | B60T 7/12 188/106 P |
| 2013/0211684 A1* | 8/2013 | Baehrle-Miller ....... | B60T 7/107 701/70 |

(Continued)

FOREIGN PATENT DOCUMENTS

| | | |
|---|---|---|
| DE | 10 2004 055 876 A1 | 5/2006 |
| DE | 10 2009 047 127 A1 | 5/2011 |
| DE | 10 2015 208 165 A1 | 4/2016 |

*Primary Examiner* — Christopher P Schwartz
(74) *Attorney, Agent, or Firm* — Maginot, Moore & Beck LLP

(57) ABSTRACT

A method for operating an automated parking brake in a motor vehicle with a hydraulic actuator for generating a hydraulic force component and an electromechanical actuator for generating an electromechanical force component, includes overlaying the hydraulic force component and the electromechanical force component to achieve a total clamping force for a parking brake process. The method further includes setting, on occurrence of a first condition, a first hydraulic pressure level, and setting, on occurrence of a second condition, a second hydraulic pressure level. The method also includes holding substantially constant the set first hydraulic pressure level with the hydraulic actuator until the occurrence of the second condition.

12 Claims, 5 Drawing Sheets

(56) References Cited

U.S. PATENT DOCUMENTS

| | | | |
|---|---|---|---|
| 2013/0226423 A1* | 8/2013 | Baehrle-Miller | B60T 7/12 701/70 |
| 2013/0226426 A1* | 8/2013 | Baehrle-Miller | B60T 13/588 701/70 |
| 2013/0338896 A1* | 12/2013 | Baehrle-Miller | B60T 7/042 701/70 |
| 2015/0217739 A1* | 8/2015 | Blattert | B60T 8/885 701/70 |
| 2016/0290425 A1* | 10/2016 | Baehrle-Miller | B60T 13/588 |
| 2018/0086325 A1* | 3/2018 | Mannherz | B60T 8/172 |

* cited by examiner

METHOD FOR OPERATING AN AUTOMATED PARKING BRAKE

This application claims priority under 35 U.S.C. § 119 to patent application no. DE 10 2016 213 645.3, filed on Jul. 26, 2016 in Germany, the disclosure of which is incorporated herein by reference in its entirety.

The present disclosure concerns a method for operating an automated parking brake in a motor vehicle, with a hydraulic actuator for generating a hydraulic force component and an electromechanical actuator for generating an electromechanical force component, wherein the hydraulic force component and the electromechanical force component are overlaid to achieve a total clamping force for a parking brake process, characterized in that on occurrence of a first condition, a first hydraulic pressure level is set and on occurrence of a second condition, a second hydraulic pressure level is set, wherein the set first hydraulic pressure level is held substantially constant by means of the hydraulic actuator until occurrence of the second condition.

BACKGROUND

The prior art includes for example patent application DE 10 2015 208 165 A1. This document describes a method for performing a parking brake process in a motor vehicle with a service brake and a parking brake, wherein a hydraulic force component and a mechanical force component are overlaid to achieve a total clamping force for the parking brake process. It is provided here that the two force components are overlaid for each parking brake process.

The prior art also includes patent application DE 10 2009 047 127 A1. This document describes a method for operating a parking brake of a vehicle, in particular a motor vehicle, which works in superposition mode, wherein the brake force of the parking brake can be applied by means of two different force-generating actuators which support each other in superposition mode. It is provided that the force-generating, in particular pressure-generating, actuator for support is already activated before the superposition.

Methods of this type which first build up hydraulic pressure and then apply the brake electromechanically have the problem that the hydraulic pressure is also effective on the vehicle axle with the applied parking brakes, usually the rear axle. Admittedly, a pressure sensor is present in the system, but this only measures the pressure at the brake master cylinder. It cannot ensure that the brake pressure is then also actually effective on the rear axle.

SUMMARY

Advantageously however, the method according to the disclosure allows the use of measuring processes and validations to check the pressure built up in the brake piston. In addition, the vehicle is stopped earlier than in conventional APB systems without hydraulic support.

This is achieved according to the disclosure by the features given in the independent claims. Further embodiments of the disclosure are the subject of the subclaims.

The method according to the disclosure for operating an automated parking brake in a motor vehicle, with a hydraulic actuator for generating a hydraulic force component and an electromechanical actuator for generating an electromechanical force component, wherein the hydraulic force component and the electromechanical force component are overlaid to achieve a total clamping force for a parking brake process, is characterized in that on occurrence of a first condition, a first hydraulic pressure level is set and on occurrence of a second condition, a second hydraulic pressure level is set, wherein the set first hydraulic pressure level is held substantially constant by means of the hydraulic actuator until occurrence of the second condition.

This means that the method is suitable for performing a parking brake process and for checking the correct build-up of clamping force. The method requires a superposition mode of the parking brake. This means that the total clamping force is not generated by a single actuator, but the forces of several actuators are overlaid to achieve the total clamping force. A simultaneous force generation takes place. The available hydraulic pressure of the parking brake alone is not therefore sufficient e.g. to achieve the necessary total clamping force—only the combination of hydraulic force component (pressure level) and electromechanical force component is sufficient. Such a superposition does not take place only on a secondary brake application process or under specific operating conditions (e.g. hot brakes), but already in an initial brake application process. Overlaying of the hydraulic and electromechanical force components therefore takes place on every parking brake process.

The hydraulic pressure level is in particular a specific pressure in the brake piston. The first and second hydraulic pressure levels are unequal and are greater than zero. Furthermore, the first and second hydraulic pressure levels are not equal to each other, wherein the second pressure level is higher than the first. The term "setting a pressure level" therefore in particular means a change starting from the other pressure level. Therefore, on each parking brake process, a defined first hydraulic pressure level is set and a defined second hydraulic pressure level is set. A first pressure level is set when a first condition is fulfilled, e.g. if a parking brake request is detected. A second pressure level is set if a second condition is fulfilled, e.g. if an idle travel of the actuating element of the electromechanical actuator is overcome and/or if a start of the electromechanical force proportion is detected.

Setting takes place in particular by means of the hydraulic actuator of the service brake. Alternatively, in particular for setting the first pressure level, a pressure reduction from a higher pre-pressure is conceivable, e.g. by means of valves. A hydraulic actuator may e.g. be a hydraulic accumulator. In particular however, this means an electrohydraulic actuator, e.g. an electric brake force amplifier (in particular with pedal travel sensor) or plunger (in particular with travel sensor) or an ESP pump. The hydraulic actuator allows the set first hydraulic pressure level to be kept constant. This creates a starting basis for a valid monitoring and allows a control functionality. Furthermore, by means of the actuator, a precise setting and if necessary adjustment of the defined pressure level is possible, and hence a high precision and validity. The method is thus independent of the hydraulic actuator element used, or different actuators may be used in different phases, or an existing driver pre-pressure taken into account. Also, a driver pre-pressure which is initially too high may be reduced without the vehicle rolling away.

By maintaining the first pressure level, advantageously the two systems acting at different speeds are balanced. Whereas by means of the hydraulic actuator, a corresponding pressure (and hence corresponding hydraulic force proportion) can be built up within a short time, the electromechanical actuator requires a longer time for generating the electromechanical force proportion (e.g. because of the necessity to overcome the idle travel). For the performance of specific functions, e.g. for monitoring a successful build-up of hydraulic pressure in the brake piston, sometimes the common performance of both systems is required. The method described creates such a starting basis and allows performance of such functions.

In an advantageous embodiment, the method is characterized in that the first hydraulic pressure level is defined such that it is possible to stop the vehicle, and/or the second hydraulic pressure level corresponds to a target pressure of the parking brake which is defined so as to allow parking of the vehicle.

The term "stop" means that—and is defined such that—rolling of the vehicle is prevented. In contrast, the term "park" is defined such that a lengthier safe parking of the vehicle is performed. It should be noted that the vehicle brakes, as already described above, are operated in superposition mode. This should be understood to mean that parking (total clamping force to be achieved) of the vehicle can only be achieved by a combination of the hydraulic pressure and the electromechanical force component. This is taken into account accordingly in the definition of said second hydraulic pressure level. The target pressure of the parking brake alone is not therefore sufficient for parking—only the combination of hydraulic force component (pressure level) and electromechanical force component is sufficient.

Because of the planned lengthy time period for parking, temporal effects must be taken into account here, such as cooling of the brake discs and the associated loss of clamping force.

Furthermore, legal regulations must also be taken into account and implemented. The defined target pressure therefore differs. The first hydraulic pressure level here is lower than the second hydraulic pressure level. Advantageously, objective conflicts can be avoided or at least alleviated by the set different pressure levels. Thus for example, even after a very short time period, stopping of the vehicle is possible. This allows both safety and comfort for the user. A high and sustained safety and fulfillment of legal requirements however is achieved only at a later time.

In one possible embodiment, the method is characterized in that on definition of the first and/or second hydraulic pressure level, a slope of the roadway is taken into account so that stopping and/or parking the vehicle on the momentary roadway incline is possible.

This means that the pressure level need not be defined absolutely fixedly. Rather, this can be adapted to the environment and driving situation. This advantageously gives an increase in safety, taking into account aspects of comfort (avoiding long brake application times) and material protection (in comparison with application of a highest possible pressure level in all situations).

In a preferred embodiment, the method is characterized in that the set first hydraulic pressure level is held substantially constant until the occurrence of the second condition, by means of control of the hydraulic actuator and/or self-inhibition in the system of the hydraulic actuator.

This means that the hydraulic pressure level is maintained at the same level on the basis of the actuator. The hydraulic actuator may be activated accordingly for this. Advantageously, this control allows very precise setting of the desired pressure level. It also allows adaptive responses to disruptions or changes in the system in order to compensate for these. Alternatively or additionally, systems are also conceivable which allow the first hydraulic pressure level generated to be held constant by means of self-inhibition in the system of the hydraulic actuator. Advantageously, no additional control system is required for this.

In an alternative refinement, the method is characterized in that the hydraulic actuator is activated such that the setting of the first hydraulic pressure level, the holding of the first hydraulic pressure level and the setting of the second hydraulic pressure level take place as part of a single activation.

This means that there are no multiple activations of the hydraulic actuator. Advantageously, the single activation avoids the disadvantage of higher load on the on-board network which occurs on multiple activations.

In an advantageous embodiment, the method is characterized in that inlet valves on the front axle of the vehicle are closed when a parking brake request is identified or the first hydraulic pressure level is reached.

This means that the hydraulic circuits of the front wheels and rear wheels are separated. A parking brake is usually positioned on the rear axle. By separating the brake systems of the front axle, the hydraulic volume of the circuit is reduced. This gives several advantages. For example, a faster build-up of hydraulic force is possible at the braking devices of the rear axle for the same power of the hydraulic actuator. Another advantage is as follows. If hydraulic pressure is built up automatically on all braking devices of the rear axle and front axle, then as stated the hydraulic volume to be moved is large. On such a displacement of hydraulic volume, an undesirable drop (i.e. lowering) of the brake pedal can occur. The user then gets an undesirable feedback. By decoupling a hydraulic circuit portion, such an undesirable effect can be reduced and the driver's comfort increased. If the inlet valves of the front axle are closed directly on detection of a parking brake request, the advantage results that less volume need be displaced into the wheel brakes by the hydraulic actuator. If valves on the front axle close as soon as a first pressure has been built up, the advantage results that the vehicle is stopped safely hydraulically via four wheels, instead of via just two wheels. In a possible embodiment, the method is characterized in that on reaching the second hydraulic pressure level until a total clamping force is achieved, the pressure level is held constant by further adjustment of the hydraulic actuator, and/or switchover valves (or other pressure-holding valves) on the rear axle of the vehicle are closed.

This means that on common force generation by the electromechanical actuator and the hydraulic actuator, the hydraulic actuator reaches its target pressure first (i.e. the target force proportion to be achieved). After reaching the second hydraulic pressure, the hydraulic actuator is then activated further but no longer with the increased current intensity as in a hydraulic force generation, in order to avoid overload. The hydraulic actuator is activated merely to maintain the set pressure. Because the electromechanical actuator acts on the same piston as a hydraulic actuator, during this "holding phase" a pressure loss may occur, in particular if the electromechanical actuator displaces the brake piston further on brake application. Such a pressure loss can advantageously be compensated by controlling the hydraulic actuator. Alternatively, on reaching the second hydraulic pressure level, the hydraulic brake circuit of the rear wheels may also be closed by means of valves. In this way the energy consumption of the hydraulic actuator may be reduced.

In a preferred refinement, the method is characterized in that it is checked whether the hydraulic pressure level, in particular the second hydraulic pressure level, is correctly set, wherein a value of the electromechanical actuator representing a force curve, in particular a current gradient, is taken into account in the check.

This means that a value of the electromechanical actuator is determined and/or analysed which represents a force curve of the electromechanical actuator. This may for example be an actual force curve or other measured or estimated data or curves representing a force. In particular, advantageously the gradient of the current intensity of the electromechanical actuator may be used for this. The data are measured for example in a time interval (phase) in which both an electromechanical force proportion and a hydraulic force proportion are generated. Alternatively or additionally, measurement takes place in a time interval (phase) in which only one of the two said force proportions is generated, this being in particular the phases t1-t4. By means of this value, it is checked whether the hydraulic pressure level is or has been correctly set. This serves as validation and fault detection. For example, too steep a current gradient may indicate an insufficient hydraulic pressure, which in turn would lead to an insufficient total clamping force, which is regarded as a fault. The fault can then be reported for example to the driver.

Advantageously, it can also be checked whether the hydraulic brake pressure generated is actually present in the brake piston. This can be detected by means of the method without the need for a sensor in the brake piston chamber. The APB as a component, even in a system in which hydraulic support is always present, is alone responsible for safe stoppage of the vehicle. Advantageously, thanks to the method described in a refinement, it is also possible to establish using APB-specific measurement values (current and/or voltage) that the pressure applied hydraulically is effective. This means a clear causality between the current signal and the applied pressure can be measured.

In an alternative embodiment, the method is characterized in that it is checked whether the hydraulic pressure level, in particular the second hydraulic pressure level, is correctly set, wherein a value of the electromechanical actuator representing a force curve, in particular a current gradient, during a first time interval, and a value of the electromechanical actuator representing a force curve, in particular a current gradient, during a second time interval are taken into account in the check, wherein in particular the values of the two time intervals are compared.

This means that several time intervals (phases) are defined over which the described values are determined and analysed. In particular, two time intervals are provided during a closing process of the parking brake, wherein a second time interval lies temporally after the first time interval. The first time interval may here e.g. be defined by the time interval in which both the electromechanical actuator and the hydraulic actuator build up a respective force component. The second time interval can here be defined accordingly e.g. as the time interval in which the electromechanical actuator builds up a force component, while the hydraulic actuator has already finished building up the hydraulic force component and may still be adjusting this. The values determined for both time intervals are compared in the analysis. Advantageously, this checks whether the necessary hydraulic pressure is present in the brake piston. This allows a valid check of the function capacity of the system.

In a preferred embodiment, the method is characterized in that a correct setting of the second hydraulic pressure level is assumed if the value of the electromechanical actuator representing the force curve, in particular the current gradient, during the first time interval is less than that during the second time interval.

This means that the values determined from both time intervals are compared and analysed with regard to their difference. It is assumed here that, due to the simultaneous displacement of the brake piston by the hydraulic actuator and the electromechanical actuator (electric motor), the current gradient of the electromechanical actuator will be lower in one time interval than without the support of the hydraulic actuator in a further time interval. For example, during the simultaneous hydraulic and electromechanical force build-up (t4-t5), a lower current gradient is expected than in the subsequent phase of electromechanical force build-up with static support pressure level (t5-t6). If however it is determined that the current gradient in the first and second time intervals is approximately the same, it is highly probable that there is insufficient hydraulic support in the first time interval, i.e. a fault in the system. As well as the simple inequality of the values, the difference between the values during the time intervals can be taken into account and analysed. In this way, it can advantageously be determined to what extent any (even if reduced) hydraulic support is still taking place. Advantageously, the method described here allows a function check and validation of a hydraulic pressure build-up in the brake piston while avoiding the need for a sensor in the piston chamber.

In an alternative embodiment, the method is characterized in that values of several electromechanical actuators are taken into account in the check, wherein in particular the values of several electromechanical actuators are compared with each other, wherein the values represent a force curve of the respective electromechanical actuator, wherein these values in particular depict a current gradient.

This means that not only can the results of different time intervals be taken into account, but also the results of various actuators. Since, in a regular parking brake system, two electromechanical actuators are active, the current gradients of the two actuators can also be compared with each other and hence a plausibility check performed. Possible actuators for comparison therefore may be e.g. the electromechanical actuators of the parking brake on the braking device of the left rear wheel and the braking device on the right rear wheel. For example, the results of two different electromechanical actuators during the same time interval may be compared. Evidently, the results of a first actuator over the two time intervals described may be compared with the results of another actuator over the same two time intervals. Differences between the two actuators may indicate faults in a defined brake circuit or brake circuit portion. Advantageously, this allows a higher safety and more detailed results in fault analysis and fault finding. Advantageously, the two parking brake actuators can be compared in a plausibility check (the respective current behaviour should be the same and correlate with the expected behaviour because of the stiffness of the system), and hence safety further increased.

In an advantageous refinement, the method is characterized in that the pressure level is determined and/or set by means of a pressure sensor and/or a travel sensor and/or algorithms for estimating pressure and/or travel and/or position of a component, in particular a spindle nut.

This means that a travel sensor, e.g. in connection with a pV characteristic curve and an algorithm for position estimation of the moved components, may replace a pressure sensor. The pressure can then advantageously be set by adjusting the travel. Here, the travel can easily be monitored or controlled by means of a sensor. Advantageously, the method may then also be used for a system without pressure sensors.

Furthermore, a control unit (9) is provided for operating an automated parking brake (13) for a motor vehicle, with a hydraulic actuator for generating a hydraulic force component and an electromechanical actuator for generating an electromechanical force component, wherein the hydraulic force component and the electromechanical force component are overlaid to achieve a total clamping force for the parking brake process. According to the disclosure, it is provided that the control unit (9) comprises means and is configured so that on occurrence of a first condition, a first hydraulic pressure level can be set and on occurrence of a second condition, a second hydraulic pressure level can be set, wherein the set first hydraulic pressure level is held substantially constant by means of the hydraulic actuator until occurrence of the second condition.

This means that the control unit is configured, in proper use, to perform the method according to any of claims 1 to 12.

Furthermore, an automated parking brake (13) is provided for a motor vehicle with a hydraulic actuator for generating a hydraulic force component and an electromechanical actuator for generating an electromechanical force component, wherein the hydraulic force component and the electromechanical force component are overlaid to achieve a total clamping force for a parking brake process. According to the disclosure, it is provided that the parking brake (13) comprises means and is configured so that on occurrence of a first condition, a first hydraulic pressure level can be set and on occurrence of a second condition, a second hydraulic pressure level can be set, wherein the set first hydraulic pressure level is held substantially constant by means of the hydraulic actuator until occurrence of the second condition.

This means that the parking brake is configured, in proper use, to perform the method according to any of claims 1 to 12.

It is pointed out that the features listed individually in the description may be combined with each other in any technically sensible fashion and indicate further embodiments of the disclosure.

Further features and advantages of the disclosure arise from the description of exemplary embodiments with reference to the enclosed figures.

DETAILED DESCRIPTION

Figure 1A:
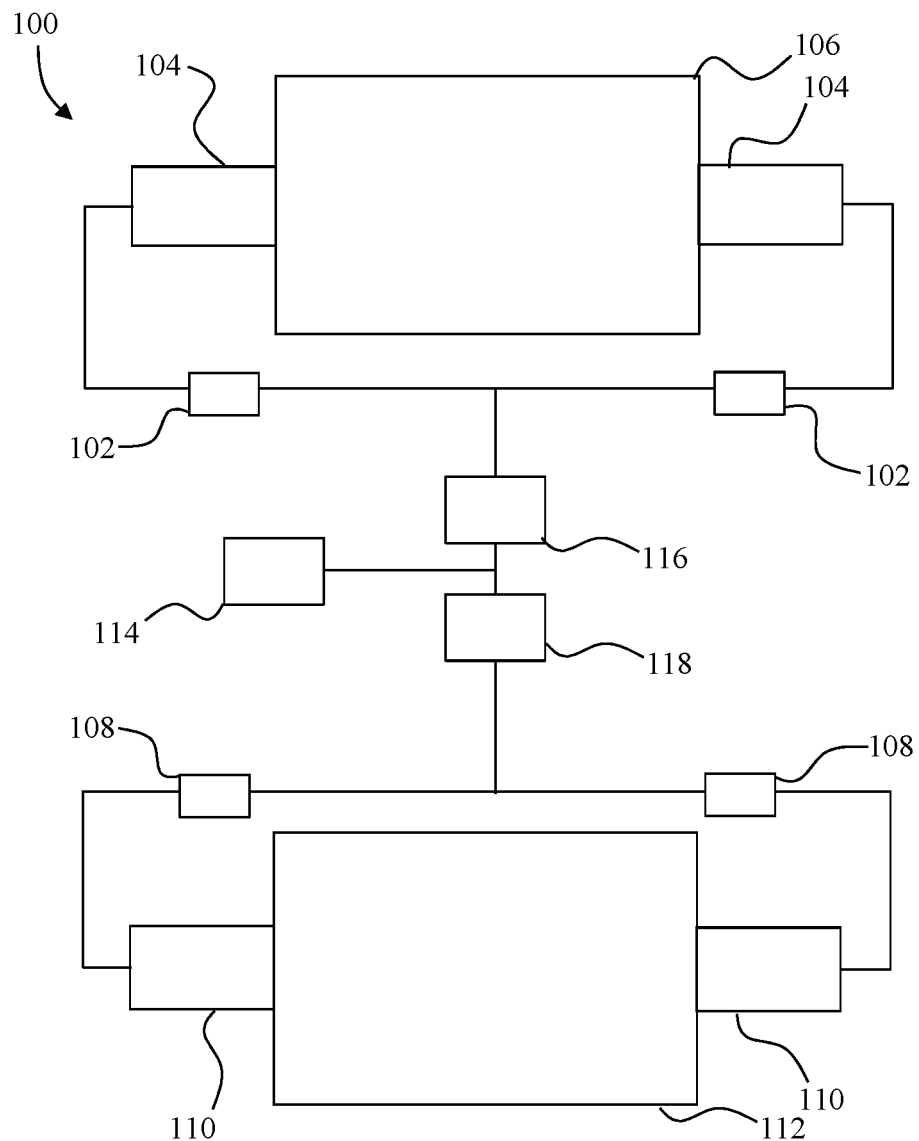
FIG. 1A shows a simplified schematic view of a hydraulic circuit.

FIG. 1A shows a simplified hydraulic system 100 with inlet valves 102 for brakes 104 of a front axle 106 of a vehicle. FIG. 1A further shows brakes 110 of a rear axle 112 of the vehicle. When inlet valves 102 are closed, the hydraulic circuits of the front wheels and rear wheels are separated. Hydraulic actuator 114 and switchover valve 118 (or other pressure-holding valves) on the rear axle of the vehicle are used in controlling pressure in the hydraulic system.

Figure 1B:
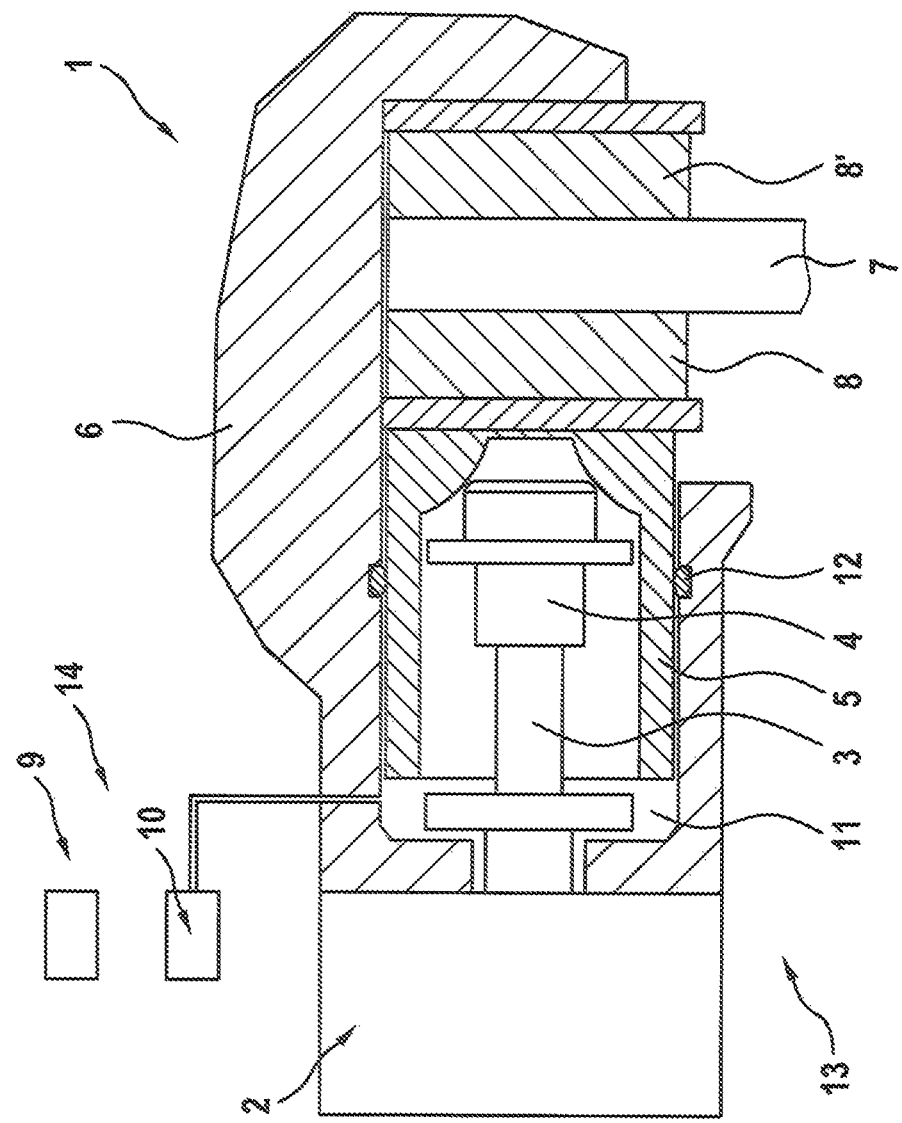
FIG. 1B shows a diagrammatic section view of a brake device with an automated parking brake in "motor on caliper" construction.

FIG. 1B shows a diagrammatic section view of a brake device 1 for a vehicle. The brake device 1 has an automated parking brake 13 (also known as automatic parking brake or APB for short) which, by means of an electromechanical actuator 2 (electric motor) can exert a clamping force for parking the vehicle. For this, the electromechanical actuator 2 of the parking brake 13 shown drives a spindle 3 mounted in an axial direction, in particular a threaded spindle 3. At its end remote from the actuator 2, the spindle 3 is provided with a spindle nut 4 which, when the automated parking brake 13 is applied, lies against the brake piston 5. The parking brake 13 thus transmits a force to the brake pads 8, 8' or brake disc 7. Here, the spindle nut 4 lies on an inner end face of the brake piston 5 (also called the back of the brake piston floor or inner piston floor). On a rotary movement of the actuator 2 and a resulting rotary movement of the spindle 3, the spindle nut 4 is moved in the axial direction. The spindle nut 4 and the brake piston 5 are mounted in a brake caliper 6 which grips a brake disc 7 in the manner of pincers.

A brake pad 8, 8' is arranged on both sides of the brake disc 7. When the brake device 1 is applied by means of the automated parking brake 13, the electric motor (actuator 2) turns, whereupon the spindle nut 4 and the brake piston 5 are moved in the axial direction towards the brake disc 7 in order to generate a predefined clamping force between the brake pads 8, 8' and the brake disc 7. Because of the spindle drive and the associated self-inhibition, a force generated at the parking brake 13 by means of activation of the electric motor is maintained even when the activation is terminated.

The automated parking brake 13 is configured e.g. as a "motor on caliper" system and combined with the service brake 14. The parking brake 13 could also be regarded as integrated in the system of the service brake 14. Both the automated parking brake 13 and the service brake 14 act on the same brake piston 5 and the same brake caliper 6 to build up a braking force of the brake disc 7. The service brake 14 however has a separate hydraulic actuator 10, e.g. a foot brake pedal with a brake force amplifier. The service brake 14 is configured in FIG. 1 as a hydraulic system, wherein the hydraulic actuator 10 is supported by the ESP pump or an electromechanical brake force amplifier (e.g. Bosch iBooster) or can be implemented thereby. Further embodiments of the actuator 10 are conceivable, e.g. in the form of a so-called IPB (integrated power brake) which in principle constitutes a brake-by-wire system in which a plunger is used to build up hydraulic pressure. On service braking, a predefined clamping force is built up hydraulically between the brake pads 8, 8' and the brake disc 7. To build up a brake force by means of the hydraulic service brake 14, a medium 11, in particular a substantially incompressible brake fluid 11, is pressed into a fluid chamber delimited by the brake piston 5 and the brake caliper 6. The brake piston 5 is sealed against the environment by means of a piston sealing ring 12.

The brake actuators 2 and 10 are activated by means of one or more end stages, i.e. by means of a control unit 9 which e.g. may be a control unit of a driving dynamics systems such as ESP (electronic stability program) or another control unit.

When the automated parking brake 13 is activated, first the idle travel or play must be overcome before a braking force can be built up. The idle travel is e.g. the distance which the spindle nut 4 must overcome by rotation of the spindle 3 in order to come into contact with the brake piston 5.

The play refers to the distance between the brake pads 8, 8' and the brake disc 7 in disc brake systems of motor vehicles. This process usually takes a relatively long time in relation to the total activation, in particular for the automated parking brake 13. At the end of such a preparation phase, the brake pads 8, 8' are laid against the brake disc 7 and the force build-up begins on further activation. FIG. 1 shows the state in which the idle travel and play are already overcome. Here, the brake pads 8, 8' are placed against the brake disc 7 and all brakes, i.e. the parking brake 13 and the service brake 14, may on subsequent activation immediately build up a braking force at the corresponding wheel. The descriptions in relation to the play apply accordingly to the service brake 14, but because of the higher pressure build-up dynamic, overcoming an idle travel takes less time than for the parking brake 13.

Figure 2:
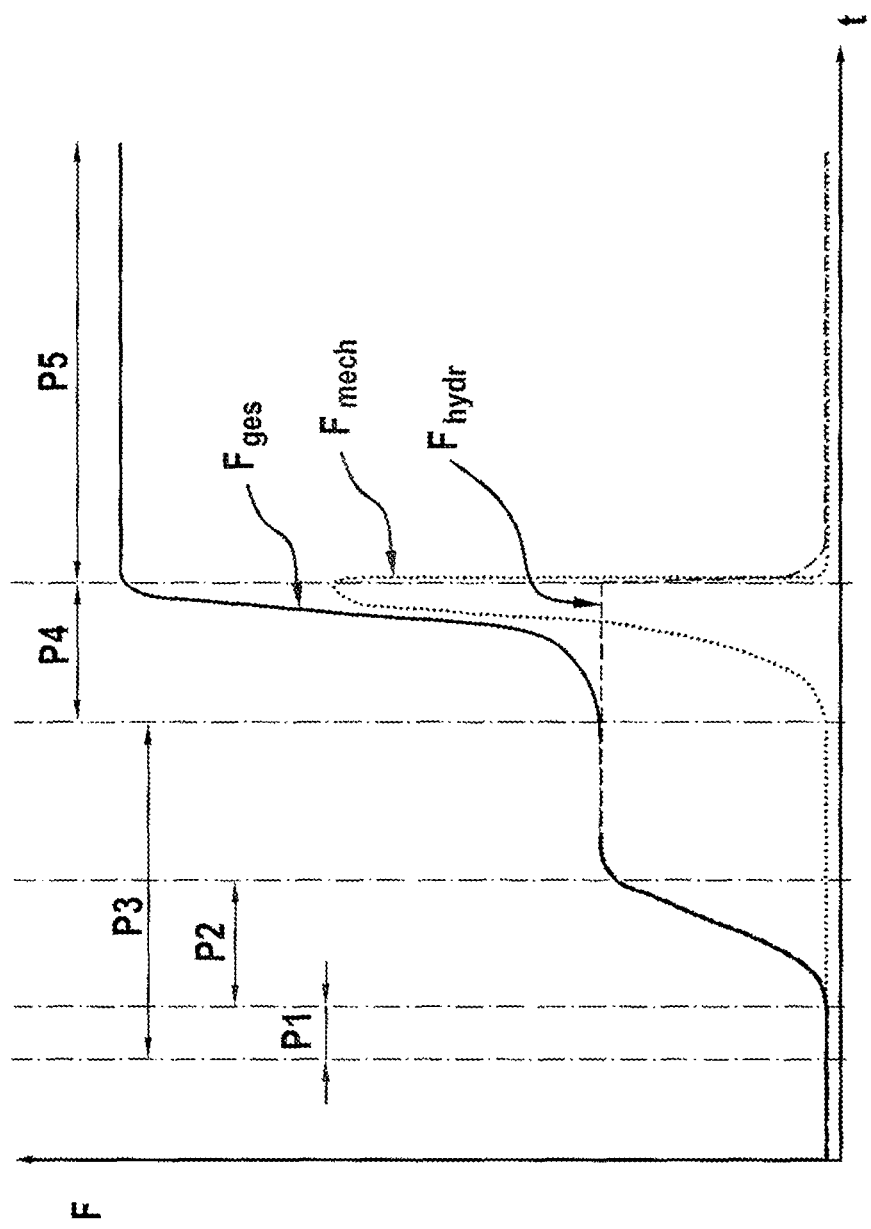
FIG. 2 shows a diagrammatic depiction of the force curve during and after the brake application phase of a parking brake process according to the application.

FIG. 2 shows a diagrammatic depiction of the force curve F during and after a brake application process according to the disclosure, over a temporal perspective t. The method starts at the beginning of phase 1. First a defined hydraulic pressure value is built up. For this, for example, an actuator of the service brake system is activated. This could for example be the iBooster. In phase P1, the idle travel and play of the service brake are overcome. In a phase P2, the electrohydraulic force component $F_{hydr}$ is generated. For this, a defined pressure value is generated. As soon as the pressure value has been generated, this need merely be maintained in the further course. In the present example, the actuator of the parking brake system is activated at the same time as activation of the actuator of the service brake system. The idle travel of the parking brake is overcome in phase P3. After overcoming the idle travel of the parking brake, i.e. when the spindle nut lies against the brake piston, on a further deflection of the spindle nut, a steep force rise occurs since the brake system is already pretensioned by means of the hydraulic service brake. The actual superposition of the parking brake and service brake takes place in this phase P4. By activating the parking brake, the electromechanical force component $F_{mech}$ is generated. This is overlaid over the present electrohydraulic force component $F_{hydr}$ and increases the achieved total clamping force $F_{ges}$. The actuator of the parking brake is activated until the required total clamping force $F_{ges}$ has been reached. This activation of the parking brake, due to the displacement of the brake piston, leads to an increase in the fluid volume between the brake caliper and the brake piston. Because of this increase in fluid volume, the hydraulic pressure may need to be adjusted by means of the service brake. This may take place in a targeted fashion by means of an iBooster system which is equipped with corresponding force sensors and means for pressure monitoring. When the total clamping force $F_{ges}$ required has been achieved, the activation is terminated, i.e. the electromechanical and electrohydraulic actuators are disengaged at the transition between phases 4 and 6. This prevents a further build-up of force. The disengagement of the actuators also leads to a reduction in the electromechanical force component $F_{mech}$ and the electrohydraulic force component $F_{hydr}$. The total clamping force $F_{ges}$ built up is maintained however, even after termination of the brake application process, since the exemplary parking brake as described is provided with a self-inhibition, as depicted in phase P5. Only an active operation of the parking brake in the reverse direction leads to a release of the parking brake, which is not however depicted in FIG. 2.

Figure 3:
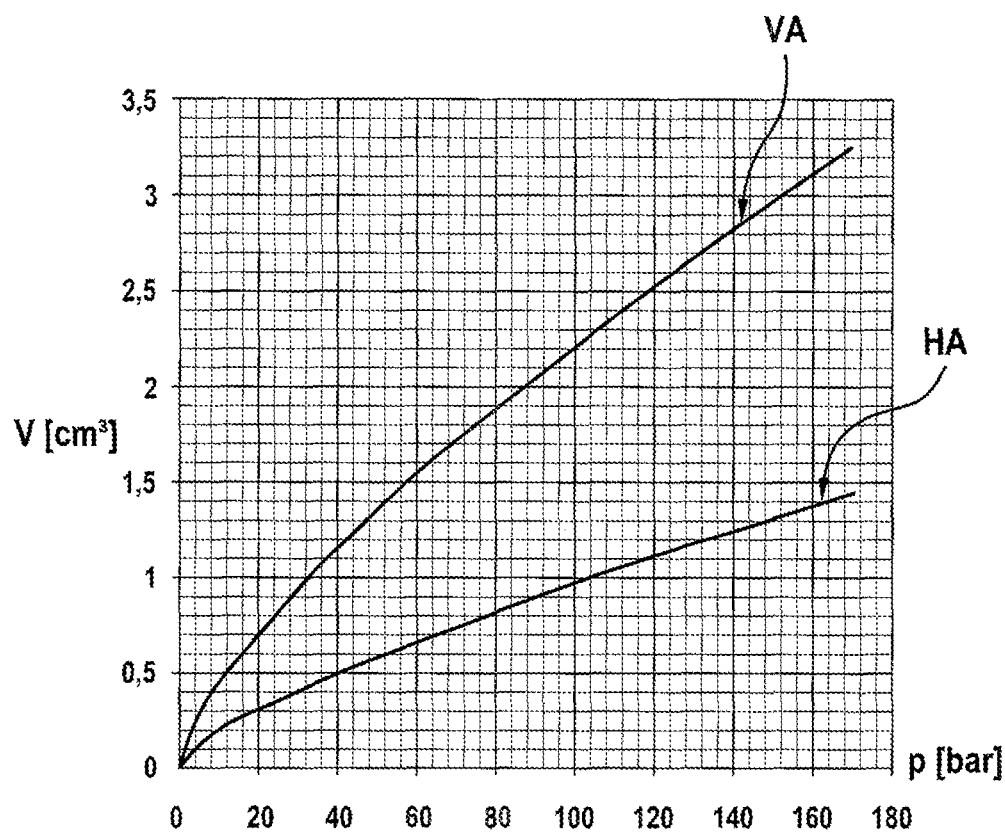
FIG. 3 shows a diagrammatic depiction of a pV curve for the rear axle and front axle.

FIG. 3 shows a diagrammatic depiction of an exemplary pV curve (pressure-volume curve) for the rear axle (HA) and the front axle (VA) of in vehicle. Using the pV curve of the corresponding vehicle, the necessary volumes to be displaced can be determined from the desired target pressure. In the method described, the hydraulic force proportion is adjusted via the travel of the hydraulic actuator. The displaced volume can be calculated from this, taking into account the master cylinder piston area.

An electric brake force amplifier is assumed below as an example, which already for component reasons contains a pedal travel sensor. An alternative would be a system with a plunger and travel sensor. If for example 20 bar are required to stop the vehicle, the travel by which the electric brake force amplifier must move the push-rod must be calculated as follows: from the pV curves, a volume capacity at each brake caliper on the front axle of 0.68 cm$^3$ and at the rear axle of 0.31 cm$^3$ can be read. Therefore the following total volume must be displaced: $V_1=2*V_{VA}+2*V_{HA1}=2*0.69$ cm$^3$+2*0.31 cm$^3$=1.98 cm$^3$. With a master brake cylinder diameter of $d_{HZ}$=23.4 mm, the area $A_{HZ}$ can be calculated as follows: $A_{HZ}=(d_{HZ})^2*pi/4=((23.4$ mm$)^2*3.14)/4=430$ mm$^2$. This then gives a push-rod travel of $S_{push}=V_1/A_{HZ}=1.98$ cm$^3$/4.30 cm$^2$=0.46 cm.

Figure 4:
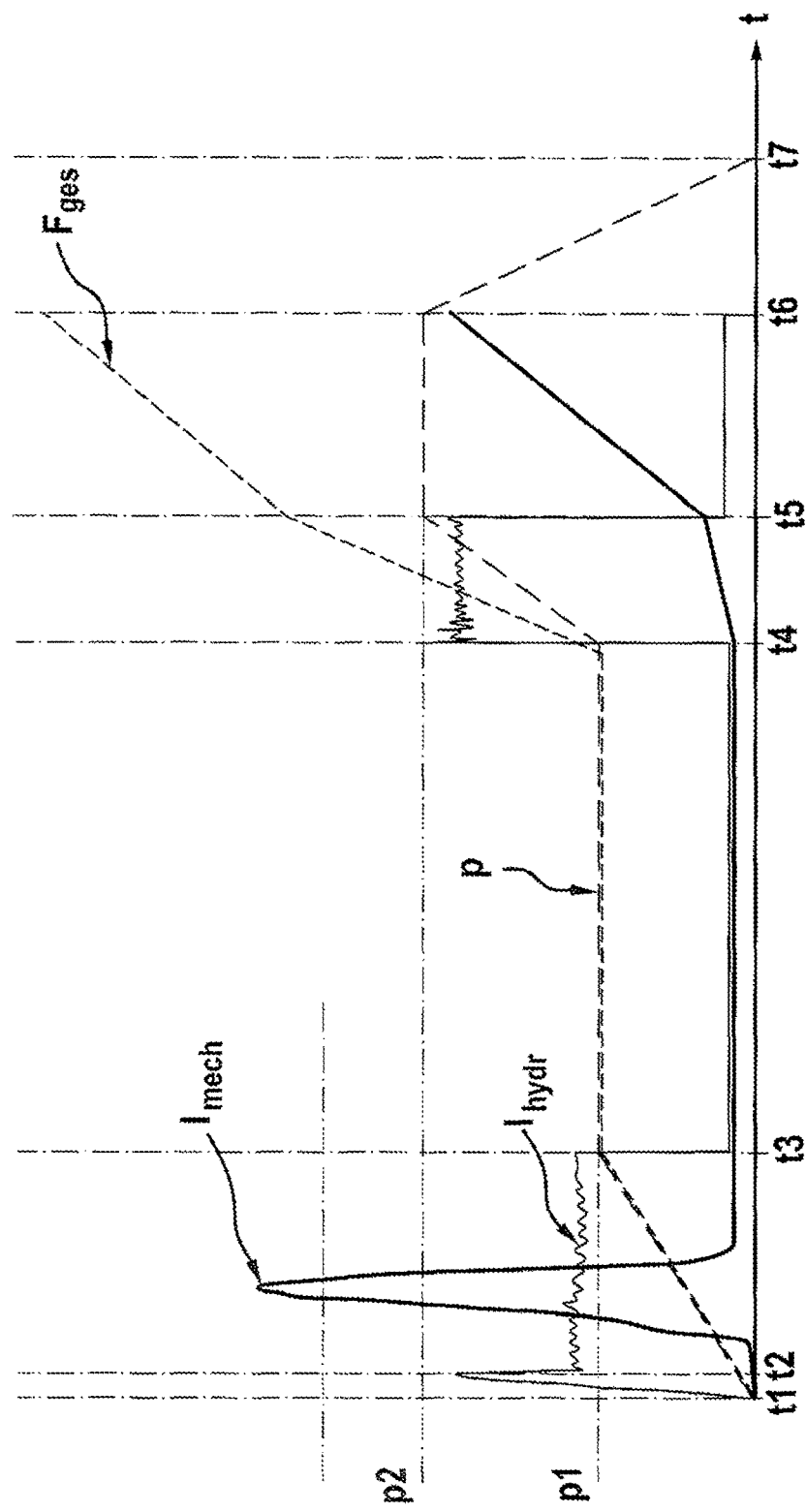
FIG. 4 shows a diagram with the time-dependent curve of the motor current of the electromechanical actuator and the hydraulic actuator, the hydraulic brake pressure and the brake pressure in the master cylinder, and the total brake force.

At low pressures, there is no linear correlation between pressure and displaced volume, so the pressure build-up in t1 to t3 is shown accordingly (see FIG. 4). During the idle phase, the push-rod is held in position in order to provide a constant hydraulic pressure. The inlet valves on the front axle are also closed.

As soon as the APB begins to build up clamping force, because of the volume capacity of the APB, the pressure in the system falls. This means firstly that the volume capacity must be compensated by further advance of the push-rod, and secondly that the target pressure in the rear axle must be built up. In order to achieve a pressure of for example 70 bar when a 20 bar pressure is already present, the following volume is necessary: $V_{HA2}=2*0.43$ cm$^3$=0.86 cm$^3$. This corresponds to a push-rod travel of $s_{push}=V_{HA2}/A_{HZ}=0.86$ cm$^3$/4.30 cm$^2$=0.2 cm. The volume displaced by the APB can be calculated as follows: with a known brake caliper stiffness of $c_{brake}$=40 kN/mm and a target clamping force for example of $F_{APB}$=10 kN, and a rear axle brake piston diameter of $d_{piston,rear}$=38 mm, hence a rear axle brake piston area of $A_{piston,rear}=d_{piston,rear}^2*pi/4=(38$ mm$)^2*3.14/4=1134$ mm$^2$, the piston travel on force build-up can be calculated as follows: $s_{piston}=F_{APB}/c_{brake}=10$ kN/(40 kN/mm)=0.25 mm, and consequently the volume displaced by the APB: $V_{APB}=2*A_{piston,rear}*S_{piston}=567$ mm$^3$≈0.57 cm$^3$. In order to hold the pressure at a constant 70 bar during the force build-up by the brake force amplifier, accordingly a further advance of the push-rod by $s_{push,APB}=V_{APB}/A_{HZ}$=0.57 cm$^3$/430 cm$^2$≈0.13 cm is required.

During the simultaneous hydraulic and electromechanical force build-up (see $t_4$ to $t_5$ in FIG. 4), as described above, a lower current gradient is expected than in the subsequent electromechanical clamping force build-up phase with static support pressure level (see $t_5$ to $t_6$ in FIG. 4). By using algorithms to estimate the position of the spindle nut of an APB system, the actual spindle nut travel in the force build-up can be calculated constantly and, because of the continuous hydraulic path, supplied to the push-rod regulation of the electric brake force amplifier as a guide parameter. In this way, the method can also be used to monitor pressure in the rear axle brakes even without a pressure sensor. After reaching the target clamping force level, the electromechanical actuator is disengaged and because of its self-inhibiting design, remains in its position. Then the hydraulic pressure can be released.

FIG. 4 shows a diagram with electrical and hydraulic status parameters on a brake application process for parking the vehicle when stationary. At time $t_1$, via an electrically controllable actuator of the hydraulic vehicle brake, a hydraulic brake pressure p is generated, for example by actuation of the ESP pump. Here, $I_{hydr}$ indicates the curve of the current intensity of the hydraulic actuator. This initially rises sharply on activation (starting peak). Until the first pressure level p1 is reached, the current intensity remains substantially constant at a defined height. At time $t_3$, the hydraulic brake pressure reaches the first level p1.

At time $t_2$, the power begins to be supplied to the electric brake motor (electromechanical actuator) with motor current $I_{mech}$ (i.e. current intensity of the electromechanical actuator), which after a starting pulse falls to an idle current value and maintains this over the period between $t_3$ and $t_4$. At time $t_3$, the hydraulic brake pressure p reaches a pre-pressure value which is retained until time $t_4$; the phase between $t_3$ and $t_4$ constitutes the idle phase of the electric brake motor. As long as the idle travel is overcome, the pressure p is held constant at pressure level p1. The current intensity $I_{hydr}$ of the hydraulic actuator required for this is lower than for pressure generation.

At time $t_4$, via the electric brake motor, an electromechanical braking force is generated and accordingly the motor current $I_{mech}$ rises starting from the level of the idle current. Then the hydraulic actuator is activated with a higher current intensity $I_{hydr}$ in order to set the desired second pressure level p2. Here, the hydraulic brake pressure p rises further starting from the first level p1, so that by overlaying the hydraulic and electromechanical brake forces, a total brake force $F_{ges}$ is set.

At time $t_5$, the hydraulic brake pressure reaches its maximum p2 which is retained until time $t_6$ and then falls again to 0 by time $t_7$. In the period between $t_5$ and $t_6$, the hydraulic pressure level p2 reached is held constant and adjusted by the hydraulic actuator. This takes place with a reduced current intensity $I_{hydr}$. In the period between $t_5$ and $t_6$, the electromechanical brake force rises further in synchrony with the brake current $I_{mech}$, until a maximum is reached.

What is claimed is:

1. A method for operating an automated parking brake in a motor vehicle having a hydraulic actuator for generating a hydraulic force component and an electromechanical actuator for generating an electromechanical force component, comprising:
    overlaying the hydraulic force component and the electromechanical force component to achieve a total clamping force for a parking brake process;
    setting a first hydraulic pressure level on occurrence of a first condition;
    setting a second hydraulic pressure level on occurrence of a second condition, the second hydraulic pressure level different from the first hydraulic pressure level;
    holding substantially constant the set first hydraulic pressure level with the hydraulic actuator until the occurrence of the second condition; and
    checking whether the second hydraulic pressure level is correctly set by taking into account a first value of the electromechanical actuator representing a force curve and/or a current gradient during a first time interval, and a second value of the electromechanical actuator representing a force curve and/or a current gradient during a second time interval, and comparing the first value and the second value.

2. The method according to claim 1, further comprising:
    defining the first hydraulic pressure level as a pressure for stopping the vehicle; and
    defining a target pressure of the automated parking brake as a pressure for parking the vehicle, wherein the second hydraulic pressure level corresponds to the defined target pressure.

3. The method according to claim 2, further comprising:
    taking into account a slope of the roadway in the defining one or more of the first hydraulic pressure level and the second hydraulic pressure level to enable one or more of stopping and parking the vehicle on a momentary roadway incline.

4. The method according to claim 1, further comprising:
    checking whether the second hydraulic pressure level is correctly set by taking into account a value of the electromechanical actuator representing a force curve and/or a current gradient.

5. The method according to claim 4, further comprising:
    taking into account values of several electromechanical actuators in the check; and
    comparing the values of several electromechanical actuators, wherein the values of several electromechanical actuators represent a force curve of a respective one of the several electromechanical actuators and/or a current gradient.

6. The method according to claim 1, further comprising:
    holding substantially constant the set first hydraulic pressure level until one or more of the occurrence of the second condition by control of the hydraulic actuator and self-inhibition in a system of the hydraulic actuator.

7. The method according to claim 1, further comprising:
    activating the hydraulic actuator such that the setting of the first hydraulic pressure level, the holding substantially constant of the set first hydraulic pressure level, and the setting of the second hydraulic pressure level take place as part of a single activation.

8. The method according to claim 1, further comprising:
    identifying a parking brake request; and
    closing inlet valves on a front axle of the vehicle when the parking brake request is identified, or the first hydraulic pressure level is reached.

9. The method according to claim 1, wherein on reaching the second hydraulic pressure level until a total clamping force is achieved, the method further comprises one or more of:
    holding constant the second hydraulic pressure level by further adjustment of the hydraulic actuator; and
    closing at least one switchover valve associated with a rear axle of the vehicle.

10. The method according to claim 1, further comprising:
    identifying a correct setting of the second hydraulic pressure level if the first value is less than the second value.

11. The method according to claim 1, further comprising:
    determining the first and the second hydraulic pressure levels using one or more of a pressure sensor, a travel sensor, algorithms for estimating pressure, algorithms for estimating travel, and algorithms for estimating a position of a component, wherein the component is a spindle nut.

12. A method for operating an automated parking brake in a motor vehicle having a hydraulic actuator for generating a hydraulic force component and an electromechanical actuator for generating an electromechanical force component, comprising:

overlaying the hydraulic force component and the electromechanical force component to achieve a total clamping force for a parking brake process;
setting a first hydraulic pressure level on occurrence of a first condition;
setting a second hydraulic pressure level on occurrence of a second condition, the second hydraulic pressure level different from the first hydraulic pressure level;
holding substantially constant the set first hydraulic pressure level with the hydraulic actuator until the occurrence of the second condition;
checking whether the second hydraulic pressure level is correctly set by taking into account a value of the electromechanical actuator representing a force curve and/or a current gradient;
taking into account values of several electromechanical actuators in the check; and
comparing the values of several electromechanical actuators, wherein the values of several electromechanical actuators represent a force curve of a respective one of the several electromechanical actuators and/or a current gradient.

\* \* \* \* \*